(12) United States Patent
Choi

(10) Patent No.: US 8,560,973 B2
(45) Date of Patent: Oct. 15, 2013

(54) MOBILE TERMINAL AND METHOD OF DISPLAYING A PLURALITY OF OBJECTS BY THE MOBILE TERMINAL

(75) Inventor: Hea Ju Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 12/708,516

(22) Filed: Feb. 18, 2010

(65) Prior Publication Data

US 2011/0041101 A1 Feb. 17, 2011

(30) Foreign Application Priority Data

Aug. 11, 2009 (KR) ........................ 10-2009-0073784

(51) Int. Cl.
*G06F 3/033* (2013.01)

(52) U.S. Cl.
USPC .......................................................... 715/863

(58) Field of Classification Search
USPC .......................................................... 715/863
See application file for complete search history.

(56) References Cited

U.S. PATENT DOCUMENTS

| | | | | |
|---|---|---|---|---|
| 5,107,443 A | * | 4/1992 | Smith et al. .................... | 715/751 |
| 5,838,317 A | * | 11/1998 | Bolnick et al. ................ | 715/764 |
| 5,859,639 A | * | 1/1999 | Ebrahim ........................ | 715/788 |
| 6,043,817 A | * | 3/2000 | Bolnick et al. ................ | 715/788 |
| 6,307,562 B1 | * | 10/2001 | Taivalsaari .................... | 345/473 |
| 6,426,761 B1 | * | 7/2002 | Kanevsky et al. ............. | 715/788 |
| 6,754,660 B1 | * | 6/2004 | MacPhail ............................ | 1/1 |
| 7,536,650 B1 | * | 5/2009 | Robertson et al. ............ | 715/767 |
| 7,979,809 B2 | * | 7/2011 | Sunday ......................... | 715/863 |
| 2005/0223334 A1 | * | 10/2005 | Guido et al. ................... | 715/794 |
| 2006/0101352 A1 | * | 5/2006 | Kohar et al. ................... | 715/788 |
| 2007/0008300 A1 | * | 1/2007 | Yang et al. .................... | 345/173 |
| 2007/0162844 A1 | * | 7/2007 | Woodall et al. ............... | 715/517 |
| 2007/0192725 A1 | * | 8/2007 | Chen et al. .................... | 715/779 |
| 2008/0282202 A1 | * | 11/2008 | Sunday ......................... | 715/863 |

\* cited by examiner

*Primary Examiner* — William Bashore
*Assistant Examiner* — Henry Orr
(74) *Attorney, Agent, or Firm* — Lee, Hong, Degerman, Kang & Waimey

(57) ABSTRACT

A mobile terminal and controlling method thereof are disclosed. The present invention includes displaying a plurality of objects on a touchscreen and if a first user command is inputted, controlling the objects pertaining to a category corresponding to the first user command among a plurality of the objects displayed on the touchscreen to move into a specific region on the touchscreen. According to at least one of embodiments of the present invention, even if numerous icons for executing diverse functions are displayed in a touchscreen type mobile terminal, the present invention facilitates a terminal user to discover a specific icon from the numerous icons.

17 Claims, 12 Drawing Sheets

(6-1)          (6-2)

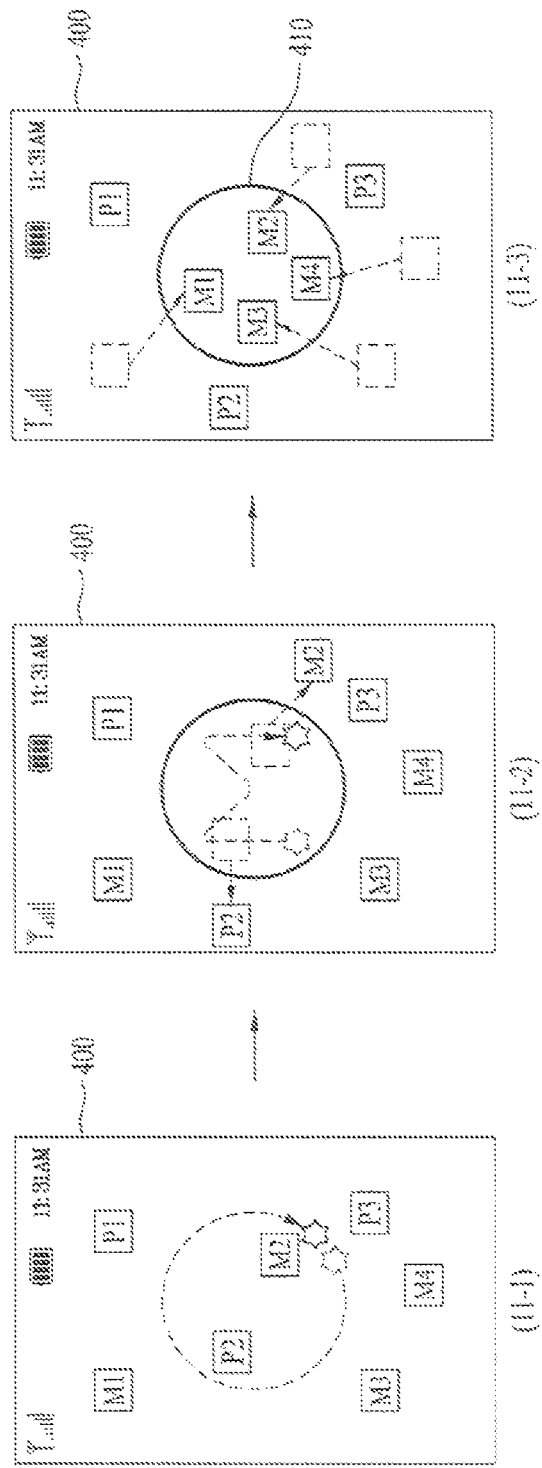

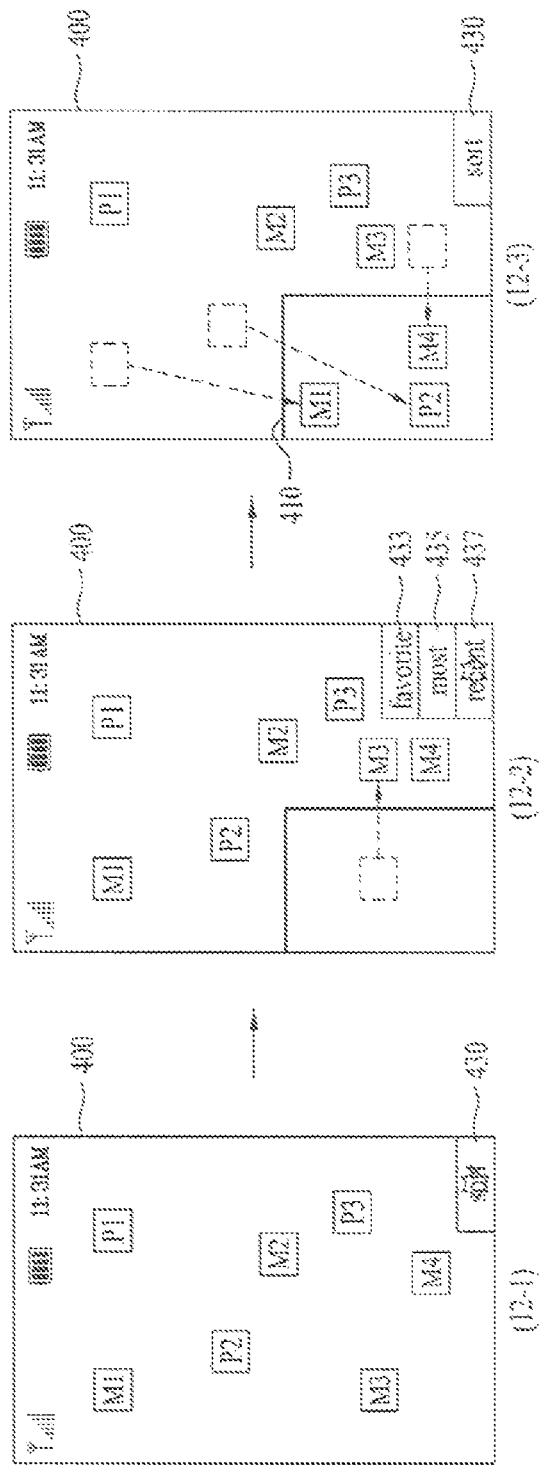

MOBILE TERMINAL AND METHOD OF DISPLAYING A PLURALITY OF OBJECTS BY THE MOBILE TERMINAL

Pursuant to 35 U.S.C. §119(a), this application claims the benefit of earlier filing date and right of priority to Korean Application No. 10-2009-0073784, filed on Aug. 11, 2009, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, various kinds of touchscreen type mobile terminals are ongoing to be introduced. Moreover, in order to execute diverse functions provided to the touchscreen type mobile terminal, numerous icons are displayed on a touchscreen of the mobile terminal. Therefore, the demand for a method of facilitating a terminal user to discover a specific desired icon from the numerous icons is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof. Even if numerous icons for executing diverse functions are displayed in a touchscreen type mobile terminal, the present invention facilitates a terminal user to discover a specific icon from the numerous icons.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display a plurality of objects thereon, and a controller configured to, if a first user command is inputted, move objects pertaining to a category corresponding to the first user command among the plurality of the objects to move into a specific region on the touchscreen.

In another aspect of the present invention, a method of controlling a mobile terminal includes the steps of displaying a plurality of objects on a touchscreen, and if a first user command is inputted, moving objects pertaining to a category corresponding to the first user command among the plurality of the objects displayed on the touchscreen into a specific region on the touchscreen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 10 to 12 are diagrams for configurations of a display screen on which a method of controlling a mobile terminal according to another embodiment of the present invention is implemented.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the suffixes 'module', 'unit' and 'part' are used for elements in order to facilitate the disclosure only.

Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
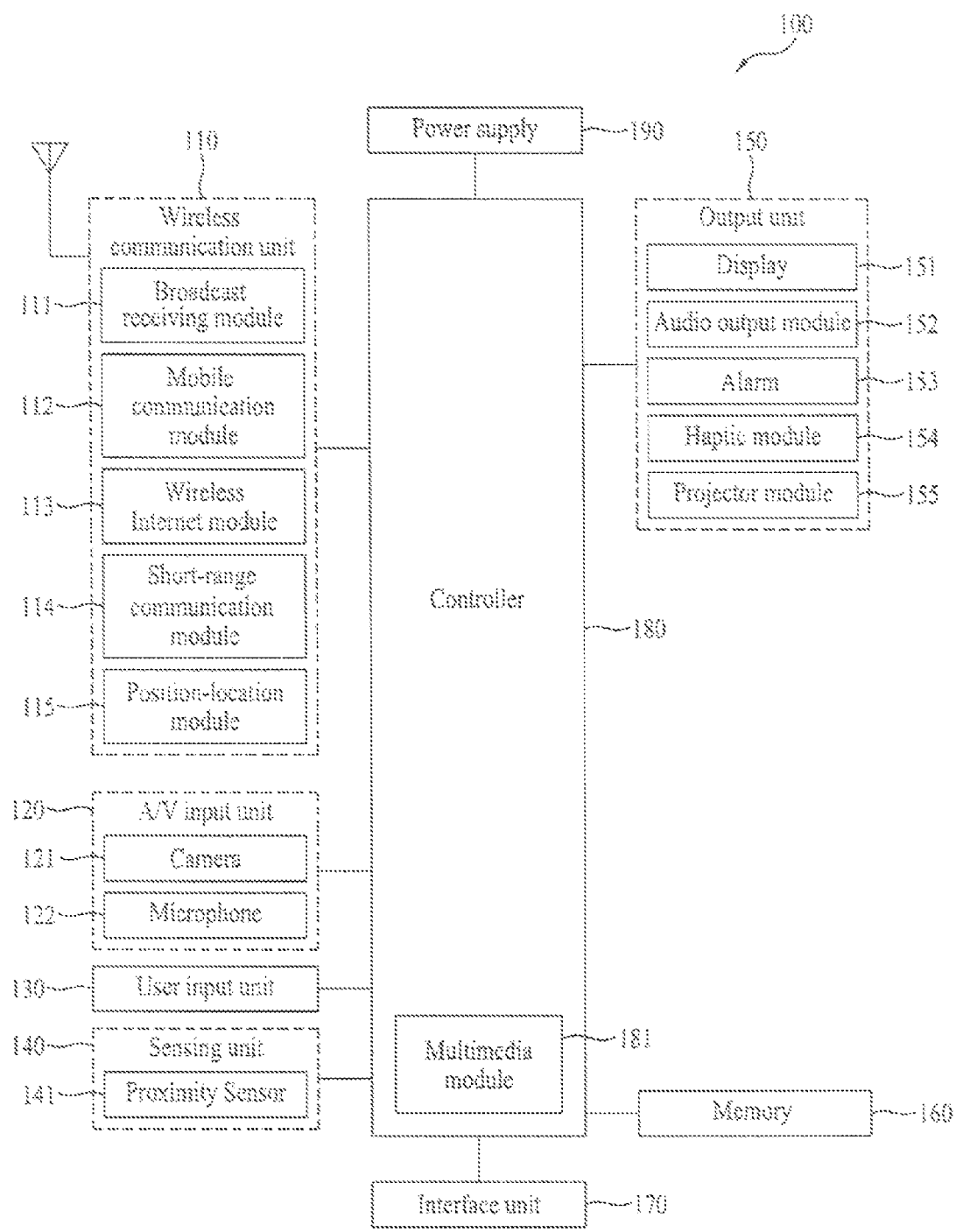
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

In the memory 160, data about touch gestures, which respectively correspond to prescribed execution functions, can be further stored. Therefore, if one touch gesture is performed on the touchscreen, one of the prescribed functions corresponding to the touch gesture can be executed in the mobile terminal 100.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
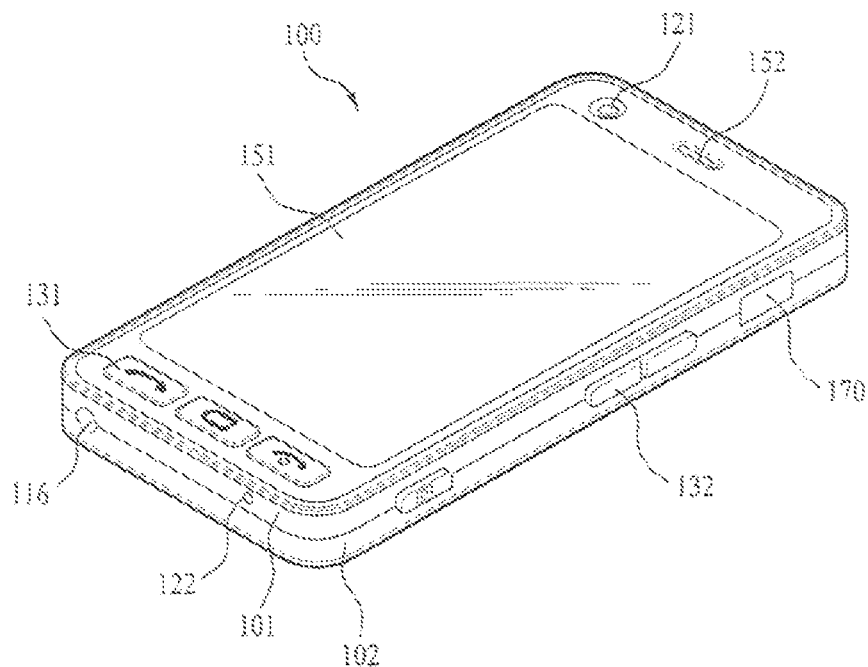
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
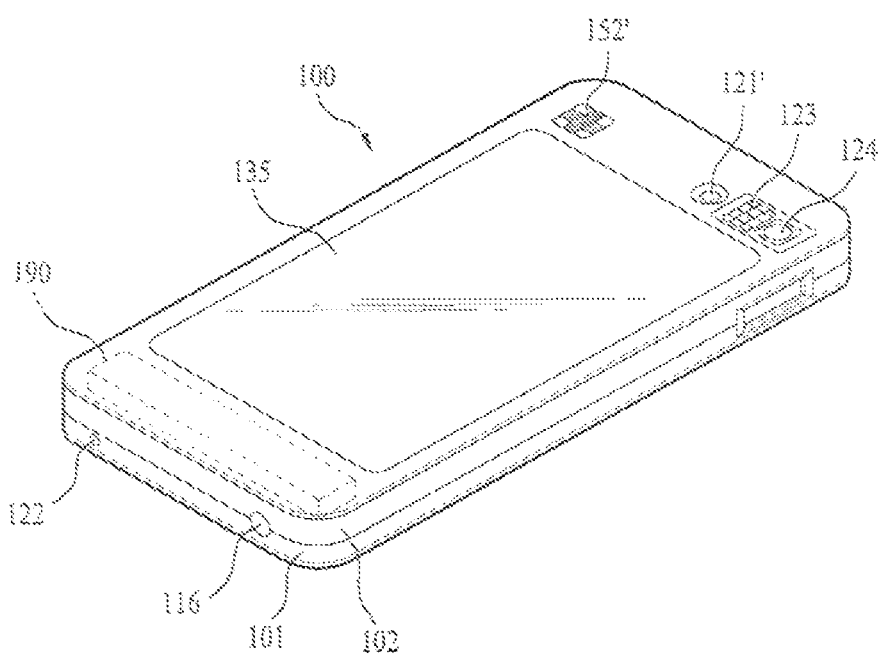
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, embodiments related to a controlling method, which can be implemented in the mobile terminal, are explained with reference to the accompanying drawings.

If the display module 151 includes a touchscreen, implementation of the following embodiment is further facilitated. Therefore, the following description is made on the assumption that the display module 151 includes a touchscreen. And, a display screen of the touchscreen 151 is indicated by a reference number 400 in the following description.

Figure 3:
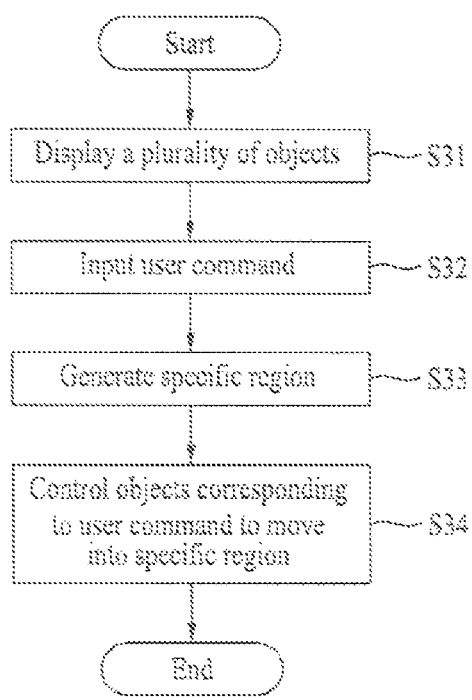
FIG. 3 is a flowchart for a method of controlling a mobile terminal according to one embodiment of the present invention.

FIG. 3 is a flowchart for a method of controlling a mobile terminal according to an embodiment of the present invention, and FIGS. 4 to 8 are diagrams for configurations of a display screen on which a method of controlling a mobile terminal according to an embodiment of the present invention is implemented.

Figure 4:
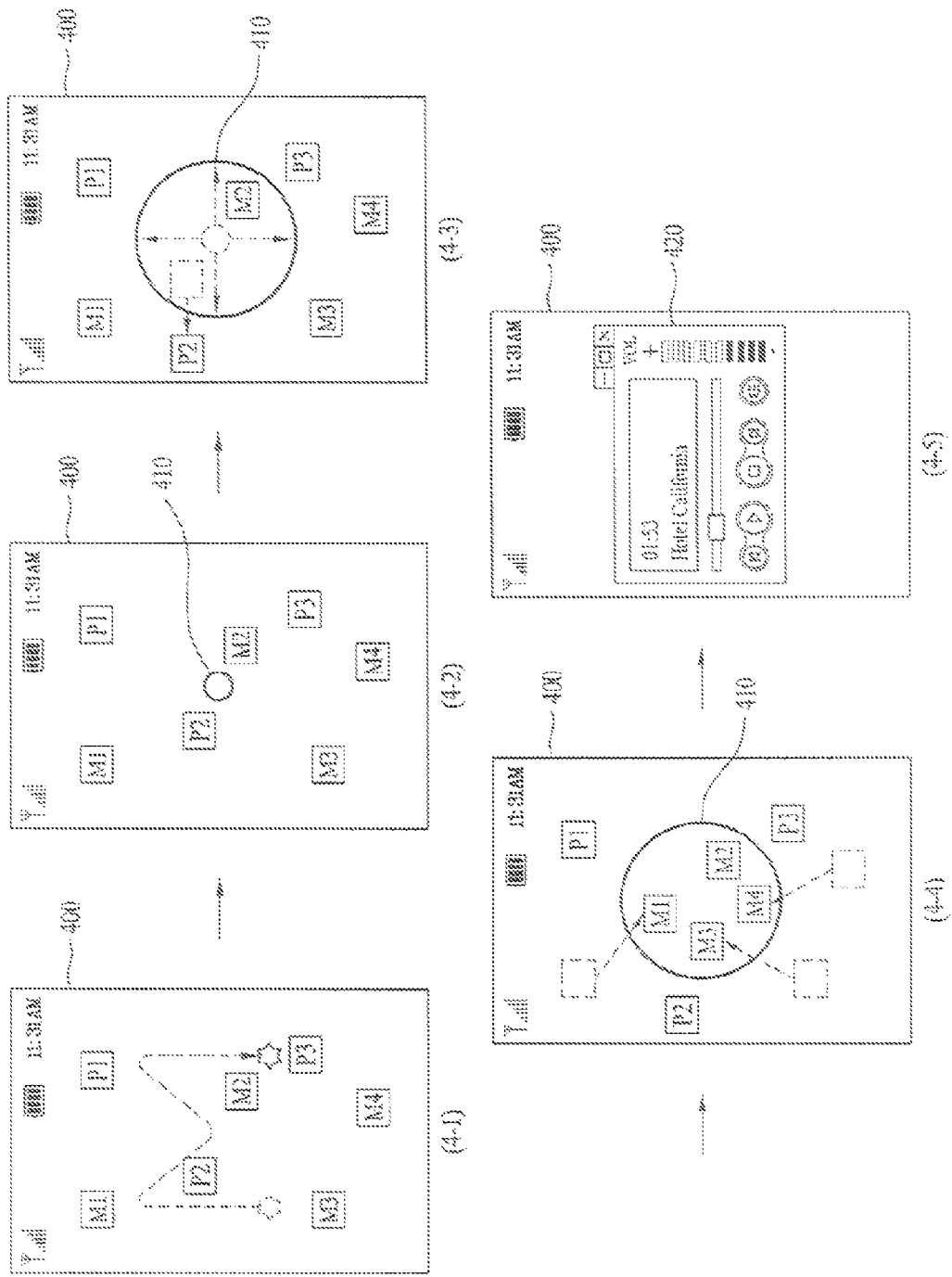
FIGS. 4 to 8 are diagrams for configurations of a display screen on which a method of controlling a mobile terminal according to one embodiment of the present invention is implemented.

Referring to (4-1) of FIG. 4, a plurality of objects M1 to M4 and P1 to P3 can be displayed on the touchscreen 400 [S31]. Each of the objects can be one of a menu icon, a multimedia icon (e.g., a moving picture icon, a still picture icon, an audio (e.g. music) icon), a text icon and the like. In the following description, for clarity of the description, the icons M1 to M4 are assumed as $1^{st}$ to $4^{th}$ music icons and the icons P1 to P3 are assumed as $1^{st}$ to $3^{rd}$ photo icons.

Subsequently, a user command is inputted via the user input unit 130 [S32]. In this case, the user command is to sort the above objects displayed on the touchscreen 400 by categories to which the objects pertain, respectively. In (4-1) of FIG. 4, exemplarily shown is that a touch gesture, which is performed in a manner of touching the touchscreen 400 with such a pointer as a finger, a stylus pen and the like and then dragging the pointer according to a prescribed shape (e.g., shape 'M'), is performed as the user command on the touchscreen 400, by which the present invention is non-limited. Alternatively, the user command can be inputted through an appropriate key button manipulation of the user input unit 130 [not shown in the drawing].

In the following description, it is assumed that the touch gesture of the prescribed shape is to sort out music icons pertaining to a music category, by which the present invention is non-limited. Alternatively, the touch gesture of the prescribed shape can be to sort output icons pertaining to a specific category (e.g., a video icon, a recently used icon, a most frequently used icon, etc.).

Referring to (4-2) to (4-4) of FIG. 4, a specific region 410 can be generated from the touchscreen 400 in a manner of increasing into a prescribed size gradually [S33]. A position of the generated specific region 410 may be fixed, or varied according to a position on which the touch gesture is performed. It is not mandatory for the specific region 410 to be configured in a manner of increasing into the prescribed size. Alternatively, the specific region 410 can be generated into the prescribed size in direct.

Moreover, a shape of the specific region 410 is non-limited. In particular, the specific region 410 can have such a looped-curve shape as a quadrangle, a triangle, etc. In FIG. 4, the specific region 410 is assumed as having a circular form.

When the specific region 410 is generated, there may exist objects that have been originally located at the generated specific region. In this case, the touch gesture related one of the objects, i.e., the 2nd music icon M2 can keep staying in the specific region 410. Yet, another object having nothing to do with the touch gesture among the objects originally located at the specific region 410 (e.g., 2nd photo icon P2) may be pushed away from the specific region 410 as the specific region 410 increases in size.

The 1st, 2nd and 4th music icons M1, M2 and M4 related to the touch gesture among objects failing to be originally located at the specific region 410 are able to move into the specific region 410 while the specific region 410 is increasing or after the specific region 410 has increased.

In particular, all of the objects (i.e., 1st to 4th music icons M1 to M4) related to the touch gesture among the objects M1 to M4 and P1 to P3 displayed on the touchscreen 400 come into gathering within the generated specific region 410 [S34].

Subsequently, referring to (4-4) of FIG. 4, a prescribed one (e.g., 1st music icon Ma) of the 1st, 2nd and 4th music icons M1, M2 and M4 located within the specific region 410 can be easily selected and touched.

If so, referring to (4-5) of FIG. 4, the music corresponding to the selected 1st music icon M1 is played back in the mobile terminal 100. Therefore, a music play window 420 for playing back the music can be displayed on the touchscreen 400.

Referring to (4-5) of FIG. 4, when the music icons gather into the specific region 410, it is not always necessary to select one of the music icons. Instead, if a prescribed user command (e.g., a touch gesture of 'X' shape) is inputted, the objects displayed on the touchscreen 400 are able to return to original positions before the generation of the specific region 410.

Figure 5:
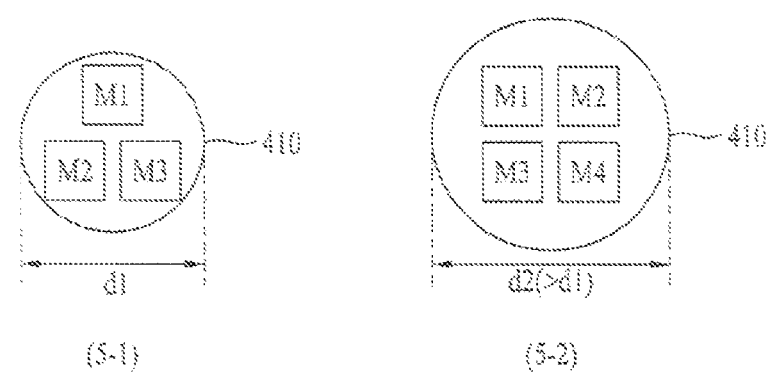
Figure 6:
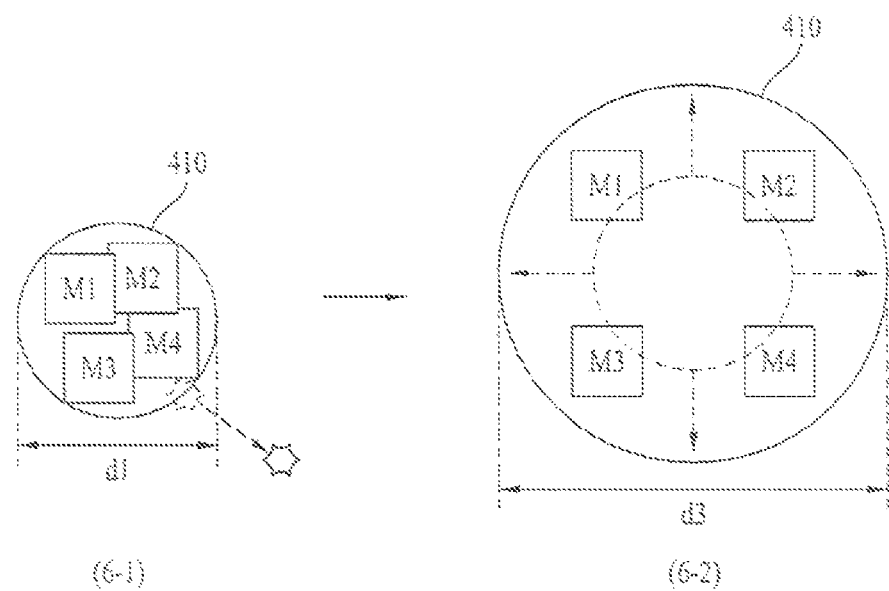

Meanwhile, referring to (5-1) and (5-2) of FIG. 5, the size (or dimensions) of the specific region 410 may become variable according to the number of the objects pertaining to the prescribed category. In (5-1) of FIG. 5, exemplarily shown is that the specific region 410 of a first size d1 is generated if the number of the objects pertaining to the prescribed category is 3. In (5-2) of FIG. 5, exemplarily shown is that the specific region 410 of a second size d2 greater than the first size d1 is generated if the number of the objects pertaining to the prescribed category is 4.

It is not mandatory for the size of the specific region 410 to become variable according to the number of the objects pertaining to the prescribed category. Namely, referring to (6-1) of FIG. 6, even if the number of the objects pertaining to the prescribed category is 4, it is still able to generate the specific region 410 of the first size d1. In this case, a size of the specific region 410 of the first size d1 is adjustable if a prescribed user command is inputted. For instance, referring to (6-2) of FIG. 6, if a boundary of the specific region 410 is touched and dragged, the size of the specific region 410 can be adjusted into a third size d3 amounting to the dragged distance. When the size of the specific region 410 is adjusted, it is able to configure the objects pertaining to the prescribed category to be automatically distributed in a manner of being uniformly scattered within the specific region substantially.

According to the above description so far, when a touch gesture of a prescribed shape is performed on the touchscreen 400, the specific region is generated. And, objects pertaining to a specific category gather into the specific region. Yet, as mentioned in the foregoing description, in order to generate the specific region, it is not always necessary to perform a touch gesture. This is explained in detail with reference to FIG. 7 as follows.

Figure 7:
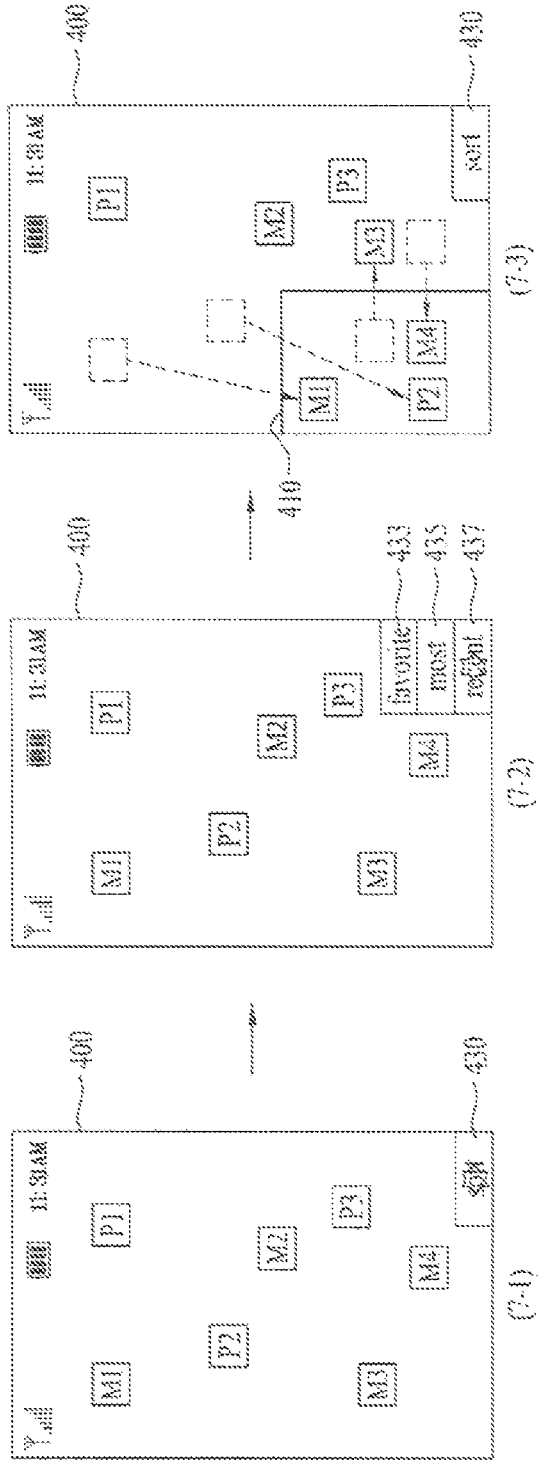

Referring to (7-1) of FIG. 7, a plurality of objects M1 to M4 and P1 to P3 can be displayed on the touchscreen 400. And, a sort icon 430 can be displayed on the touchscreen 400 to sort out the objects by categories.

First of all, the sort icon 430 is touched and selected for example.

If so, referring to (7-2) of FIG. 7, category icons including a preferred object category icon 433, a most frequently used object category 435, a recently used category icon 437 and the like are displayed on the touchscreen 400 for example. The above category icons are just exemplary. It is able to omit some of the category icons. And, icons pertaining to another category are displayable as well.

Alternatively, instead of displaying the sort icon 430, it is able to display the category icons 433, 435 and 437 from the beginning.

Subsequently, one 437 of the category icons is touched and selected.

If so, referring to (7-3) of FIG. 7, the specific region 410 is generated. Objects corresponding to the selected category are then able to move into the specific region 410. This is explained in the foregoing description and its details are omitted from the following description for clarity of this disclosure.

According to the above description, objects pertaining to a prescribed category among objects substantially displayed on the touchscreen 400 gather into the specific region, by which the present invention is non-limited. Alternatively, it is able to configure the objects, which pertain to the prescribed category among objects failing to be displayed on the touchscreen 400, to gather into the specific region. This is explained in detail with reference to FIG. 8 as follows.

Figure 8:
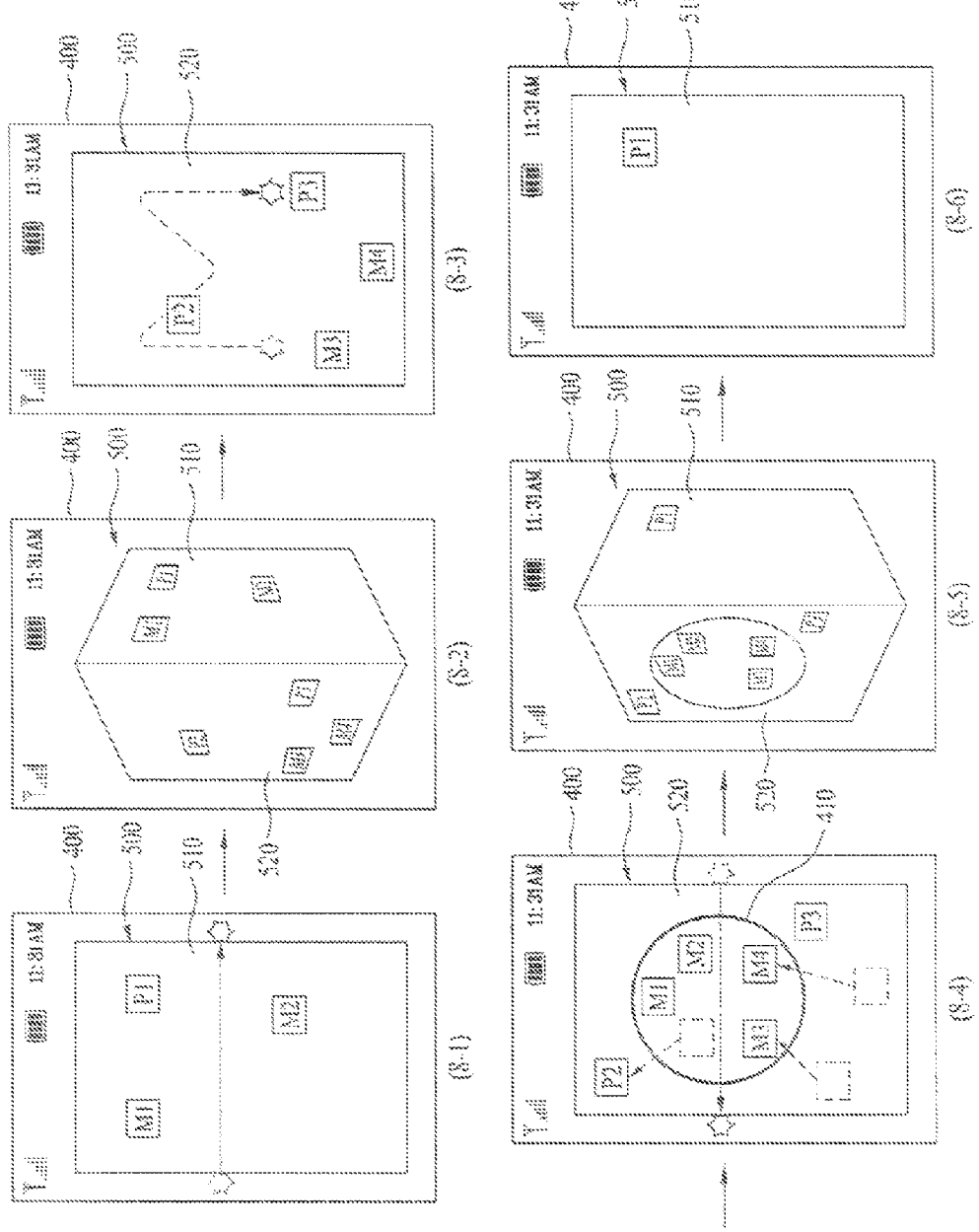

Referring to (8-1) of FIG. 8, a virtual polyhedron 500 can be displayed on the touchscreen 400. No limitation is put on the polyhedron 500. For instance, the polyhedron can include a square pillar or a trigonal prism. In (8-1) of FIG. 8, exemplarily shown is that one facet of the polyhedron, i.e., a first facet 510 is displayed in front direction on the touchscreen 400. It is able to arrange objects on each facet of the polyhedron 500. In (8-1) of FIG. 8, exemplarily shown is that a $1^{st}$ music icon M1, a second music icon M2 and a first photo icon P1 are displayed on the first facet 510 of the polyhedron 500.

Subsequently, a user command for rotating the polyhedron 500 can be inputted via the user input unit 130. In this case, the user command can include a touch & drag in one direction on the touchscreen 400 for example.

If so, referring to (8-2) and (8-3) of FIG. 8, the polyhedron 500 is rotated. Accordingly, as the polyhedron 500 is rotated, another facet of the polyhedron 500, i.e., a second facet 520, as shown in (8-3) of FIG. 8, can be displayed. A $3^{rd}$ music icon M3, a $4^{th}$ music icon M4, a second photo icon P2 and a $3^{rd}$ photo icon P3 are exemplarily displayed on the second facet 520.

A touch gesture corresponding to a prescribed category is performed on the touchscreen 400.

If so, referring to (8-4) of FIG. 8, the specific region 410 is generated on the touchscreen 400. Objects pertaining to the prescribed category are sorted to gather into the specific region 410. The objects gathering into the specific region 410 by being sorted out can include icons on the first facet 510 (e.g., the $1^{st}$ and $2^{nd}$ music icons M1 and M2 on the first facet 510) failing to be displayed on the touchscreen 400 as well as the $3^{rd}$ and $4^{th}$ music icons M3 and M4 on the second facet 520 currently displayed on the touchscreen 400.

Therefore, referring to (8-5) and (8-6) of FIG. 8, although the polyhedron 500 is rotated again to enable the first facet 510 to be displayed on the touchscreen 400, the $1^{st}$ and $2^{nd}$ music icons M1 and M2 originally located on the first facet may not be displayed because they have moved away into the specific region 410 of the second facet 520.

If other objects pertaining to the prescribed category exist on other facets of the polyhedron 500 except the first and second facets, they can move into the specific region 410 as well.

In brief, while one facet of the virtual polyhedron 500 is being displayed on the touchscreen 400, if a user command for sorting out an object corresponding to the prescribed category is inputted, object pertaining to the prescribed category, which exist on all of the facets of the virtual polyhedron 500, can move into the specific region 410.

According to the above description, the specific region is generated by one user command and objects pertaining to a prescribed category gather into the specific region, by which the present invention is non-limited. Alternatively, if one user command is inputted, the specific region is generated. Subsequently, if another user command is inputted, objects pertaining to a prescribed category can be configured to gather into the specific region. This is explained in detail with reference to FIGS. 9 to 12 as follows.

Figure 9:
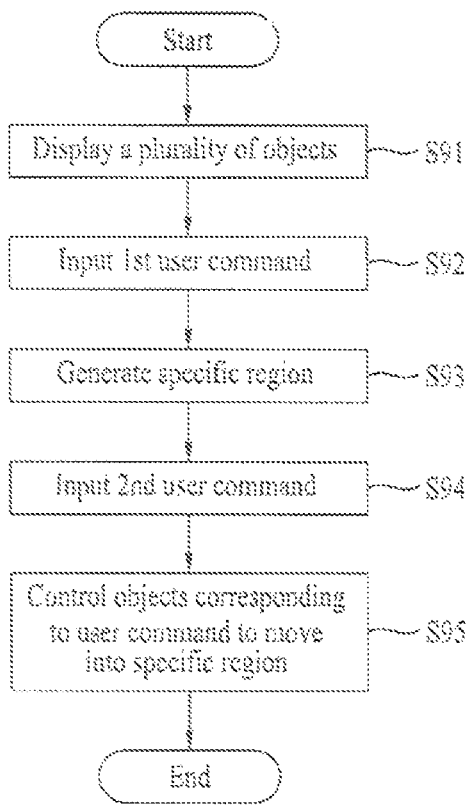
FIG. 9 is a flowchart for a method of controlling a mobile terminal according to another embodiment of the present invention.

FIG. 9 is a flowchart for a method of controlling a mobile terminal according to another embodiment of the present invention. And, FIGS. 10 to 12 are diagrams for configurations of a display screen on which a method of controlling a mobile terminal according to another embodiment of the present invention is implemented.

Figure 10:
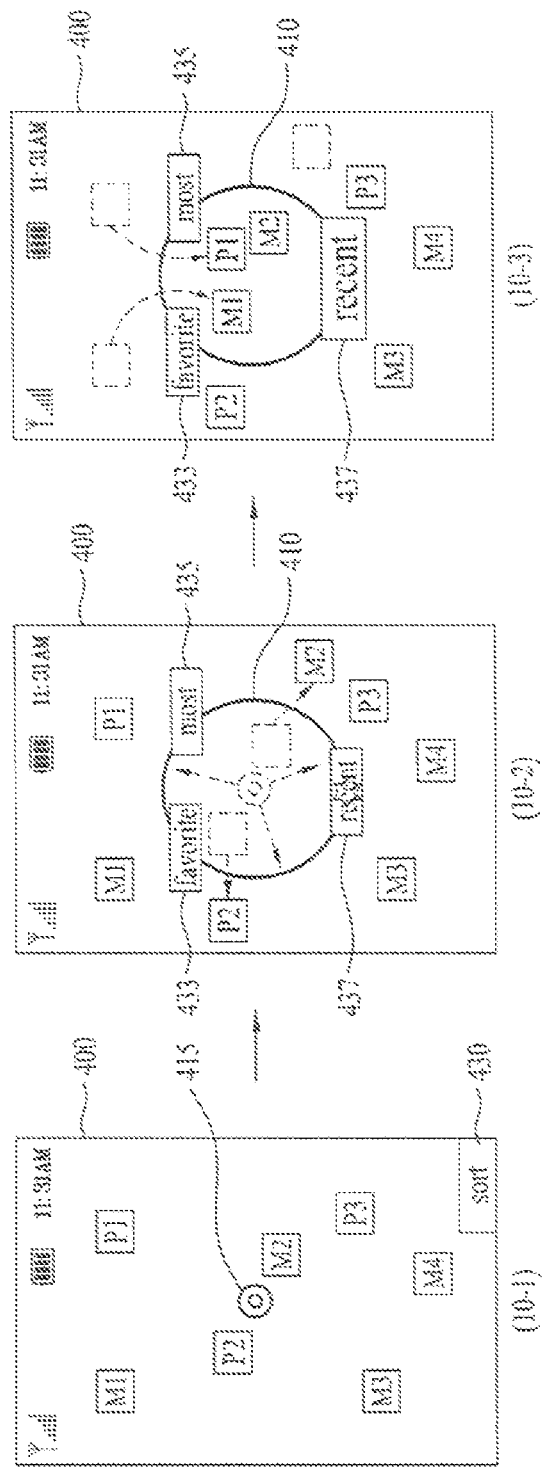

Referring to (10-1) of FIG. 10, a plurality of objects M1 to M4 and P1 to P3 can be displayed on the touchscreen 400 [S91]. A specific region generating icon 415 for generating a specific region 410 can be displayed on the touchscreen 400.

Subsequently, a first user command for generating the specific region 410 can be inputted [S92]. In (10-1) of FIG. 10, exemplarily shown is that the first user command is performed in a manner of touching a specific region generating icon 415 on the touchscreen 400.

If so, referring to (10-2) of FIG. 10, the specific region 410 is generated on the touchscreen 400.

When the specific region 410 is generated, the objects M2 and P2 may have been originally located at the generated specific region 410. In this case, these objects M2 and P2 are made to move away from the specific region on generating the specific region 410.

And, category icons including a preferred object category icon 433, a most frequently used object category 435, a recently used category icon 437 and the like are displayed on the touchscreen 400 for example. These category icons are just exemplary. As mentioned in the foregoing description, at least one of the category icons can be omitted or other category icons are displayable. In (10-2) of FIG. 10, exemplarily shown is that the category icons are located on the boundary of the specific region 410, by which the present embodiment is non-limited. Alternatively, the category icons can be arranged at any position on the touchscreen 400.

Subsequently, it is able to input a second user command for selecting a prescribed category [S94]. In (10-2) of FIG. 10, exemplarily shown is that the second user command is performed in a manner of touching an icon corresponding to the prescribed category from the category icons on the touchscreen 400.

If so, referring to (10-3) of FIG. 10, a shape of the selected category icon 437 can change to be visually discriminated from other category icons 433 and 435. In (10-3) of FIG. 10, exemplarily shown is that a size of the selected category icon 437 gests greater than that of each of the category icons 433 and 435, by which the present embodiment is non-limited. Alternatively, the selected category icon 437 can change to differ from other category icons 433 and 435 in either a shape or a color.

Subsequently, the objects M1, M2 and P1 pertaining to the prescribed category move into the specific region 410 [S95]. If one of the objects within the specific region 410 is selected, the mobile terminal 100 is able to execute a function related to the selected object. This is explained in the foregoing description and its details are omitted from the following description for clarity of this disclosure.

According to the above description, after the specific region generating icon 415 is displayed, if the specific region generating icon 415 is touched, the specific region 410 is generated. Yet, in order to generate the specific region 410, the specific region generating icon 415 is not mandatory. This is explained in detail with reference to FIG. 11 as follows.

Referring to (11-1) of FIG. 11, a plurality of objects M1 to M4 and P1 to P3 can be displayed on the touchscreen 400. After the touchscreen 400 has been touched with such a pointer as a finger, a stylus pen and the like, the pointer is dragged to form a looped curve. In this case, the looped curve can have any shape.

If so, referring to (11-2) of FIG. 11, the specific region 410 having the shape of the looped curve is generated on the touchscreen 400.

When the specific region 410 is generated, the objects M2 and P2 may have been originally located at the generated specific region. If so, as mentioned in the foregoing description, the objects M2 and P2 move away from the specific region 410 when the specific region 410 is generated.

Subsequently, referring to (11-2) of FIG. 11, a touch gesture is performed on the touchscreen 400 in a manner of touching the touchscreen 400 with the pointer and then dragging the pointer according to a prescribed shape (e.g., 'M' shape). In particular, the touch gesture may be performed within the specific region 410. Alternatively, the touch gesture is performed on the touchscreen 400 without being limited to the specific region 410.

If so, referring to (11-3) of FIG. 11, the objects pertaining to the category corresponding to the touch gesture of the prescribed shape can move into the specific region 410. If one of the objects within the specific region 410 is selected, the mobile terminal 100 is able to execute a function related to the selected object. This is explained in the foregoing description and its details are omitted from the following description for clarity of this disclosure.

FIG. 12 is described as follows.

Referring to (12-1) of FIG. 12, a plurality of objects M1 to M4 and P1 to P3 can be displayed on the touchscreen 400. And, as mentioned in the foregoing description, a sort icon 430 can be displayed on the touchscreen 400 to sort out the objects by categories.

First of all, the sort icon 430 is touched and selected for example.

If so, referring to (12-2) of FIG. 12, category icons including a preferred object category icon 433, a most frequently used object category 435, a recently used category icon 437 and the like are displayed on the touchscreen 400 for example.

And, the specific region 410 can be displayed on the touchscreen 400.

When the specific region 410 is generated, the object M3 may have been originally located at the generated specific region. If so, as mentioned in the foregoing description, the objects M3 is made to move away from the specific region 410 on generating the specific region 410.

Subsequently, one 437 of the category icons is touched and selected.

If so, referring to (12-3) of FIG. 12, the objects corresponding to the selected category can move into the specific region 410. This is explained in the foregoing description and its details are omitted from the following description for clarity of this disclosure.

Accordingly, the present invention provides the following effects and/or advantages.

First of all, according to at least one of embodiments of the present invention, even if numerous icons for executing diverse functions are displayed in a touchscreen type mobile terminal, the present invention facilitates a terminal user to discover a specific desired icon from the numerous icons.

It will be apparent to those skilled in the art that various modifications and variations can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a touchscreen; and
   a controller configured to:
      display a plurality of objects on the touchscreen, the plurality of objects comprising at least two objects belonging to a specific category and at least one other object not belonging to the specific category;
      newly generate a specific region on the touchscreen; and
      in response to a single input of a first user command corresponding to the specific category, move all of the objects belonging to the specific category among the plurality of objects into the newly generated specific region on the touchscreen, the all of the objects including the at least two objects belonging to the specific category, and move the at least one other object not belonging to the specific category out of the newly generated specific region on the touchscreen.

2. The mobile terminal of claim 1, wherein the controller is further configured to newly generate the specific region when the first user command is input or a second user command different from the first user command is input.

3. The mobile terminal of claim 2, wherein the controller is further configured to newly generate the specific region at a fixed position on the touchscreen.

4. The mobile terminal of claim 2, wherein the controller is further configured to control a size of the newly generated specific region to be fixed irrespective of the number of the all of the objects including the at least two objects.

5. The mobile terminal of claim 2, wherein the controller is further configured to control a size of the newly generated specific region to be adjusted.

6. The mobile terminal of claim 5, wherein the controller is further configured to control the size of the newly generated specific region to be automatically adjusted according to the number of the all of the objects including the at least two objects.

7. The mobile terminal of claim 5, wherein:
   the controller is further configured to control the size of the newly generated specific region to be adjusted if a third user command is input; and
   the controller is further configured to control the all of the objects including the at least two objects located within the newly generated specific region to be distributed in a manner such that the all of the objects including the at least two objects located within the newly generated specific region are evenly scattered within the newly generated specific region if the size of the newly generated specific region is adjusted.

8. The mobile terminal of claim 2, wherein the single input of the first user command corresponds to a touch of an icon corresponding to the specific category among a plurality of icons displayed on the touchscreen.

9. The mobile terminal of claim 2, wherein the single input of the first user command corresponds to a preset touch gesture on the touchscreen, the preset touch gesture corresponding to the specific category.

10. The mobile terminal of claim 2, wherein the controller is further configured to move all objects located at a position of the newly generated specific region out of the newly generated specific region upon newly generating the specific region if the specific region is newly generated when the second user command is input.

11. The mobile terminal of claim 10, wherein the second user command is input by touching a preset point on the touchscreen.

12. The mobile terminal of claim 10, wherein the second user command is input by performing a touch & drag of a looped curve shape on the touchscreen.

13. The mobile terminal of claim 1, wherein, when the plurality of objects are scattered on a virtual image displayed on the touchscreen, the controller is further configured to move the all of the objects including the at least two objects among the plurality of objects scattered on the virtual image to the newly generated specific region in response to the single input of the first user command.

14. A method of displaying a plurality of objects by a mobile terminal, the method comprising:
   displaying the plurality of objects on a touchscreen, the plurality of objects comprising at least two objects belonging to a specific category and at least one other object not belonging to the specific category;
   newly generating a specific region on the touchscreen; and
   in response to a single input of a first user command corresponding to the specific category, moving all of the objects belonging to the specific category among the plurality of objects into the newly generated specific region on the touchscreen, the all of the objects including the at least two objects belonging to the specific category, and moving the at least one other object not belonging to the specific category out of the newly generated specific region on the touchscreen.

15. The method of claim 14, wherein displaying the plurality of objects on the touchscreen comprises mixedly displaying the at least two objects and the at least one other object on the touchscreen.

16. The mobile terminal of claim 1, wherein the controller is further configured to display the plurality of objects on the touchscreen by mixedly displaying the at least two objects and the at least one other object on the touchscreen.

17. The mobile terminal of claim 2, wherein the controller is further configured to:
   display a first object of the at least two objects and a second object of the at least one other object in an area before the specific region is newly generated to occupy the area;
   maintain the first object in the area after the specific region is newly generated; and
   move the second object out of the area after the specific region is newly generated.

* * * * *